(12) United States Patent
Gaben et al.

(10) Patent No.: US 8,395,358 B2
(45) Date of Patent: *Mar. 12, 2013

(54) METHOD FOR MANAGING THE HEAT IN AN ELECTRIC BATTERY

(75) Inventors: Fabien Gaben, Ecully (FR); Alain Douarre, Gif sur Yvette (FR)

(73) Assignee: Dow Kokam France SAS, Massy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/204,437

(22) Filed: Aug. 5, 2011

(65) Prior Publication Data

US 2012/0025785 A1 Feb. 2, 2012

Related U.S. Application Data

(63) Continuation of application No. PCT/FR2010/000095, filed on Feb. 9, 2010.

(30) Foreign Application Priority Data

Feb. 9, 2009 (FR) ..................... 09 00564

(51) Int. Cl.
*H02J 7/00* (2006.01)
*H01M 10/50* (2006.01)

(52) U.S. Cl. ........... 320/150; 320/154; 320/160; 429/62

(58) Field of Classification Search ................... 320/150
See application file for complete search history.

(56) References Cited

U.S. PATENT DOCUMENTS

| | | | |
|---|---|---|---|
| 5,795,664 A * | 8/1998 | Kelly ................................ 429/7 |
| 5,808,445 A * | 9/1998 | Aylor et al. .................... 320/132 |
| 6,057,050 A * | 5/2000 | Parise ................................ 429/7 |
| 6,138,466 A * | 10/2000 | Lake et al. ........................ 62/199 |
| 6,166,524 A * | 12/2000 | Takeuchi et al. ............... 320/132 |
| 6,307,379 B2 * | 10/2001 | Podrazhansky et al. ...... 324/432 |
| 6,366,054 B1 * | 4/2002 | Hoenig et al. ................. 320/132 |
| 6,789,026 B2 * | 9/2004 | Barsoukov et al. ............. 702/63 |
| 6,914,414 B2 * | 7/2005 | Hamada et al. ............... 320/107 |
| 7,102,310 B2 * | 9/2006 | Ishishita ........................ 318/268 |
| 2003/0087148 A1 | 5/2003 | Minamiura |
| 2003/0118891 A1 | 6/2003 | Saito et al. |
| 2008/0076011 A1 | 3/2008 | Emori et al. |
| 2008/0311466 A1 | 12/2008 | Yang et al. |
| 2012/0028087 A1 | 2/2012 | Gaben et al. |

FOREIGN PATENT DOCUMENTS

| | | |
|---|---|---|
| EP | 1876051 A1 | 1/2008 |
| EP | 1906483 A1 | 4/2008 |
| JP | 09-019074 A | 1/1997 |
| JP | 2004-281077 A | 10/2004 |

* cited by examiner

*Primary Examiner* — Yalkew Fantu
(74) *Attorney, Agent, or Firm* — Harness, Dickey & Pierce, P.L.C.

(57) ABSTRACT

The invention relates to a method for managing the heat in an electric battery including a plurality of elements for generating electric power, the method including, when recharging said battery from an external power source, preconditioning said battery at an average temperature $T_0$ and, when using said battery, determining the absolute value $\Delta T_2$ of the difference between the temperature $T_0$ and the average temperature T of said battery, wherein said method includes activating a heat-conditioning device of the battery when the difference $\Delta T_2$ is higher than a setpoint $C_2$, said setpoint being established on the basis of the state of charge (SOC) of said battery.

13 Claims, 1 Drawing Sheet

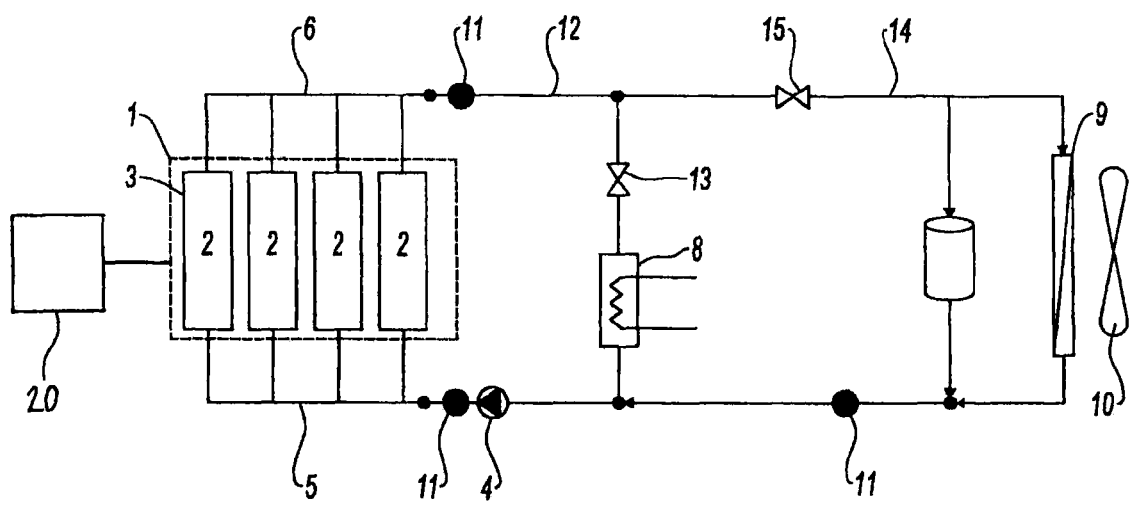

though the elements in use.

Furthermore, when the heat is not controlled, the elements during the elements can present the risks of thermal loss which decreases during the operation of electrical devices.

METHOD FOR MANAGING THE HEAT IN AN ELECTRIC BATTERY

CROSS-REFERENCE TO RELATED APPLICATIONS

This application is a continuation of International Application No. PCT/FR2010/000095, filed Feb. 9, 2010, which claims the benefit and priority of French Application No. 0900564, filed Feb. 9, 2009. The entire disclosures of the above applications are incorporated herein by reference.

BACKGROUND

The invention relates to a method of thermal management for an electric battery that is in particular intended for the traction of an electrical or hybrid motor vehicle, that is to say comprising an electric motor driving the drive wheels combined with a thermal engine driving these wheels or possibly other drive wheels.

In particular, the invention applies to a high degree of hybridization of thermal vehicles which may go as far as complete electrification of the traction chain. In this case, the batteries do not then merely serve to assist the vehicles in the acceleration phases but also to provide movement of the vehicle autonomously over greater or lesser distances.

The electric battery can also find its application in other technical fields, for example the storage of electric energy in other modes of transportation, particularly in aeronautics. Moreover, in stationary applications, such as for windmills, the thermal management of a battery according to the invention can also be advantageously used.

To guarantee the levels of power and/or energy required for the applications in question, it is necessary to create batteries comprising a plurality of electric energy generating elements which can be mounted in series.

The generating elements conventionally comprise at least one electrochemical cell, for example of the lithium-ion or lithium-polymer type which can be formed by a stack of electroactive layers acting successively as cathodes and anodes, said layers being put in contact by means of an electrolyte.

However, when these elements are charged and discharged, heat is produced which, when it is not controlled, can decrease the service life of the elements, and, under extreme conditions, can even present risks of thermal runaway for certain chemical compositions of cells, leading to deterioration of the battery.

To optimize the safety, performance, and lifetime of batteries, systems for thermal conditioning the elements have therefore been integrated in the batteries so as to maintain the temperature of said batteries within an optimum temperature range.

Furthermore, in the automotive application that is envisioned, these systems must be very efficient since the thermal dissipation peaks are dependent on the current densities and the variations thereof, which can reach very high values, particularly during phases of strong accelerations, regenerative brakings, rapid recharging of the battery or highway operation in electric mode. In addition, high-energy batteries, which use thick elements whose heat-producing exchange-surface-to-volume-ratio is reduced, must consequently be cooled down in a particularly efficient manner.

In particular, thermal conditioning systems can comprise a chamber formed essentially around the generating elements, in which a fluid for thermal exchange with said elements circulates. In addition, to provide thermal conditioning, the known systems comprise a device for heating and/or a device for cooling the fluid in circulation. This way, by thermally conditioning the fluid and by having a continuous flow of said fluid circulate around the elements, the thermal conditioning of the battery can be carried out.

However, this thermal management strategy leads to the appearance of a temperature gradient within the elements, the amplitude of which is great in high-energy batteries since it depends, among other things, on the:

difference of temperatures between the fluid and the elements;

thickness of the elements;

thermal conduction properties between the core of the elements and the fluid;

thermal power released by the elements in use.

However, when it becomes too substantial, this temperature gradient causes a thermal imbalance of the elements which leads to a risk for the safety and service life of the battery. Indeed, the local internal capacities and resistances within the elements depend on the local temperature of the latter. The electrochemistry of the elements can thus be stressed in a different manner; a local over-stressing can lead to an acceleration of the aging phenomena.

Furthermore, the thermal conditioning of the battery consumes a substantial part of the electric energy aboard the vehicle. This extra energy consumption causes a loss of autonomy of the electric vehicles. To preserve the autonomy targeted by the application, it can be necessary to compensate this extra consumption by oversizing the battery, which is not cost-effective from a purely economic standpoint.

In addition, high energy Li-ion battery elements have internal resistances which are very sensitive to temperature. Because of this particularity, if the autonomy and performance of the batteries for electric vehicles are to be preserved in cold weather, warming them up by means of the thermal conditioning system becomes necessary. This warming up can also be a source of energy consumption in driving phases.

Finally, increasing the size of the elements to obtain a battery with high energy density can be regarded as placing in parallel stacks of electroactive elements. In case of high inrush currents, the current taking preferably the path with the least resistance, the balancing of the resistances between each elementary branch placed in parallel becomes fundamental.

These differences of internal resistances can lead to a local over-concentration of the current which causes a voltage drop within an element. Since this drop cannot be detected by measuring the overall voltage of the element, this can lead to a risk of exceeding a voltage threshold that is "dangerous" for the electrochemistry of said element.

SUMMARY

The invention aims at overcoming the drawbacks of the prior art by providing, in particular, a thermal management method for a battery which enables limiting the electric consumption necessary to its thermal conditioning so as to increase its autonomy by preserving its service life as well as its operating safety.

To this end, the invention proposes a thermal management method for an electric battery comprising a plurality of electric energy generating elements, said method providing for pre-conditioning said battery at an average temperature $T_0$ when recharging the battery from an external power source, and determining the absolute value $\Delta T_2$ of the difference between temperature $T_0$ and the average temperature T of said battery during use of said battery, said method providing for activating a thermal conditioning device of said battery when the difference $\Delta T_2$ is greater than a setpoint $C_2$, said setpoint being established as a function of the state of charge (SOC) of said battery.

DRAWINGS

Other particularities and advantages of the invention will become apparent from the description that follows, with reference to the annexed drawing which represents an architecture for the implementation of a thermal management method for an electric battery according to an embodiment of the invention.

FIG. 1 is a schematic depicting a circuit useful in the methods of the present technology.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom.

As exemplified in FIG. 1, the method allows for the thermal management of an electric battery 1, said management being understood as much in terms of addition as in terms of retrieval of calories so as to maintain the battery 1 within an optimum temperature operating range. In particular, the method makes it possible to enable a rapid and efficient addition or retrieval of calories in the battery 1, so as to ensure thermal regulation, under whichever conditions of use.

The battery 1 comprises a plurality of elements 2 generating electric energy. In particular, the elements 2 comprise at least one electrochemical cell, for example of the lithium-ion or lithium-polymer type.

Each cell is formed by a stack of electroactive layers acting successively as cathodes and anodes, said layers being put in contact by means of an electrolyte. The layers can be contained in a flexible envelope. Alternatively, they can be contained in a rigid container.

In an exemplary embodiment, the elements 2 are each formed with two electrochemical cells mounted electrically in parallel. In addition, the battery 1 comprises a plurality of modules which are formed by several elements 2 mounted electrically in series, said modules being also mounted electrically in series.

According to an embodiment, the method plans on using a thermal conditioning system comprising a chamber containing a fluid of thermal exchange with the elements 2, said chamber extending essentially around said elements to enable thermal exchange in the area of their walls. The fluid can be a gas, particularly air, or a liquid, particularly a low-voltage dielectric liquid of steam or water, possibly glycolated.

With respect to the drawing, the chamber comprises envelopes 3 which are each formed around an element 2, said envelopes being supplied with fluid by a closed circuit. In addition, the conditioning system comprises a device for putting the fluid in circulation in the chamber which, in the drawing, is in the form of a pump 4. More precisely, the circuit has an upstream portion 5 and a downstream portion 6 between which the fluid can circulate through the envelopes 3, said circuit comprising also an expansion tank 7.

In particular, the envelopes 3 provide thermal conditioning in parallel with each of the elements 2, which means that the fluid running in an envelope 3 originates directly from the upstream portion 5, without having first run through another envelope 3. This results in excellent thermal uniformity by avoiding heat build up connected to a succession of thermal exchanges with the elements 2.

To provide thermal conditioning, the system further comprises at least one thermal conditioning device for said fluid. The circuit shown includes a device for warming up the fluid, for example in the form of an immersion heater 8 as well as a device for cooling the fluid. In particular, the cooling device comprises a thermal exchanger 9 with the outside or with a cooling loop, equipped, in particular, with a fan 10.

In an alternative that is not shown, the cooling and warming devices can be integrated with the same exchanger, for example air-air, water-water, or air-water, capable of cooling or warming up the fluid as a function of the need.

When the battery 1 recharges from an external power source 20, the method provides for preconditioning said battery at an average temperature $T_0$. In particular, this preconditioning temperature can be provided, particularly depending on the season, to enable an optimum operation of the battery 1, for example by being set between 15 and 30° C. for a Lithium-based electrochemistry. This way, no matter the ambient temperature, particularly depending on the season, the operation of the battery 1 can be optimized from the beginning of its use.

In addition, this preconditioning makes it possible to not affect the autonomy of the battery 1 since the necessary energy is drawn from the external power source 20, particularly from the electric network to which the battery 1 is plugged-in during recharging.

Furthermore, during the thermal preconditioning of the battery 1, the circulation device 4, alone or respectively associated with one of the thermal conditioning devices 8, 9, can be activated in order to maintain or, respectively reach, the preconditioning temperature $T_0$ uniformly in the entire battery 1.

When the battery 1 is in use, the method provides for having several iterative steps which are carried out at a frequency that is sufficient to ensure a good thermal conditioning of the battery 1 relative to its autonomy, its service life, as well as its safety.

The method provides for determining the absolute value $T_2$ of the difference between the temperature $T_0$ and the average temperature T of the battery 1. To determine the average temperature of the battery 1, the conditioning system can comprise several sensors 11 for measuring the temperature of the fluid. The embodiment shown provides for temperature sensors 11 respectively at the input of the upstream portion 5, at the output of the downstream portion 6, and downstream of the cooling device 9.

Then, the method provides for controlling specifically a conditioning device as a function of the determined difference $\Delta T_2$. In particular, a thermal conditioning device is activated when the difference $\Delta T_2$ is greater than the setpoint $C_2$.

Therefore, the method makes it possible to save on the electric consumption of the conditioning devices 8, 9, when the difference $\Delta T_2$ is less than the setpoint $C_2$. Consequently, the setpoint $C_2$ is established so that no thermal conditioning is necessary as long as the difference $\Delta T_2$ does not exceed it. Thus, the safety of the battery 1 is ensured against a too high or too low operating temperature, only when this scenario arises in order to limit the electric consumption necessary to the thermal conditioning.

In particular, if the difference $\Delta T_2$ is greater than the setpoint $C_2$, the method provides for the activation of the warming device 8, or cooling device 9, respectively, when the temperature T is less, more, respectively, than the temperature $T_0$. According to an embodiment, the setpoint $C_2$ has a first value $C_2$, beyond which the warming device 8 is activated and a second value $C_{2f}$ beyond which the cooling device 9 is activated.

In the embodiment shown, the deactivation and activation, respectively, of the cooling device 9 is carried out by shunting and supplying, respectively, of the circulation of the fluid in the exchanger 9.

For this purpose, the circuit has a primary loop 12 equipped with a first valve 13, said loop connecting the battery 1 to the warming device 8 and a secondary loop 14 equipped with a second valve 15, said secondary loop connecting said primary loop to the exchanger 9. Thus, the selective actuation of the valves 13, 15 enables the shunting or supplying of the circulation of the fluid in the exchanger 9.

To improve the service life of the battery 1 and limit the electric consumption necessary to its thermal conditioning, the method further provides for the setpoint $C_2$ to be established as a function of the state of charge SOC of the battery 1.

In particular, the rule for setting up the setpoint $C_2$ is in descending order as a function of the state of charge SOC. Indeed, the elements are all the less sensitive to thermal aging as their state of charge is low.

According to an embodiment, the rule can be written in the form:

$C_2 = C_0 - a(SOC) - b(SOC)^2$, SOC varying between 0 and 1 as a function of the state of charge of the battery 1, a and b being parameters established as a function of the characteristics of the battery 1, $C_0$ being a maximum setpoint.

In particular, the maximum setpoint $C_0$ can be equal to or on the order of a+b. Thus, for a maximum SOC, the setpoint $C_2$ is close to zero, so as to protect the elements 2 against any thermal aging when the load is at a maximum. For example, b can be on the order of two times a, particularly by using a=5 and b=10.

The method described further comprises the determination of the difference $\Delta T_1$ between the temperatures of the hottest element 2 and the coldest element 2. For this purpose, a temperature sensor can be provided to measure the temperature directly on the element 2, particularly on the connectors of said element. Alternatively, the differences of temperature $\Delta T_1$ and/or $\Delta T_2$ can be determined indirectly by means of an operating parameter of the battery 1, particularly by analyzing the intensity of the current which is delivered by said battery.

Then, the method provides for controlling specifically the conditioning system as a function of the determined differences $\Delta T_1$, $\Delta T_2$. This way, when the difference $\Delta T_1$ is less than a setpoint $C_1$, the method provides for deactivating the circulating device 4 as well as the thermal conditioning devices 8, 9. Typically, the setpoint $C_1$ can be established between 2 and 5° C. without impacting the good operation of the battery 1.

Therefore, on the basis of the thermal inertia of the battery 1, particularly because of the large quantity of fluid contained in the chamber, the thermal conditioning is provided without consuming the electric energy of said battery. In addition, the invention avoids the use of a continuous flow of thermally conditioned fluid so as to limit the creation of a thermal gradient between the walls and the core of said elements.

However, when the difference $\Delta T_1$ is greater than the setpoint $C_1$, the method provides for activating the circulating device 4 of the fluid by keeping the thermal conditioning devices 8, 9 deactivated if the difference $\Delta T_2$ is less than the setpoint $C_2$. In particular, the activation of the circulating device 4 and/or the activation of the thermal conditioning device 8, 9 can correspond to an operation of said devices according to a predefined setpoint, or to an automatic control of said operation as a function of the differences $\Delta T_1$ and/or $\Delta T_2$.

Thus, even when the difference $\Delta T_2$ is less than the setpoint $C_2$, the method makes it possible to ensure temperature uniformity between the elements 2. In addition, this uniformity without thermal conditioning of the fluid limits the thermal gradient between said fluid and the elements 2 as well as within the elements 2 themselves.

The value of the preconditioning temperature $T_0$ as well as the values of the setpoints $C_1$, $C_2$ can be established by programming in the algorithm of thermal management of the battery 1, said values being adjusted as a function of the characteristics of the battery 1 and/or of the weather conditions during its use.

What is claimed is:

1. A method of thermal management for an electric battery comprising a plurality of elements generating electric energy, said method providing, when recharging the battery from an external power source, for pre-conditioning said battery at an average temperature $T_0$, and, during use of said battery, for determining the absolute value $\Delta T_2$ of the difference between the temperature $T_0$ and the average temperature T of said battery, said method providing for activating a thermal conditioning device of said battery when the difference $\Delta T_2$ is greater than a setpoint $C_2$, said setpoint being established as a function of the state of charge (SOC) of said battery.

2. The method of thermal management according to claim 1, wherein a rule for setting up the setpoint $C_2$ is in descending order as a function of the state of charge (SOC).

3. The method of thermal management according to claim 1, wherein, in the case whereby the difference $\Delta T_2$ is greater than the setpoint $C_2$, it provides for the activation of a warming device or a cooling device, respectively, when the temperature T is less than, or greater than, respectively, the temperature $T_0$.

4. The method of thermal management according to claim 3, wherein the setpoint $C_2$ has a first value $C_{2c}$ beyond which the warming device is activated and a second value $C_{2f}$ beyond which the cooling device is activated.

5. The method of thermal management according to claim 1, wherein the preconditioning temperature $T_0$ is set between 15 and 30° C.

6. The method of thermal management according to claim 1, wherein it provides for using a thermal conditioning system comprising a chamber containing a fluid of thermal exchange with said elements, said system further comprising a circulating device for circulating said fluid in said chamber and at least one thermal conditioning device of said fluid.

7. The method of thermal management according to claim 6, wherein the temperature of the fluid is measured to determine the average temperature T of the battery.

8. The method of thermal management according to claim 6, wherein it further provides, during the use of the battery, for determining the difference $\Delta T_1$ between the temperatures of the hottest element and of the coldest element and:
   when the difference $\Delta T_1$ is less than the setpoint $C_1$, for deactivating the circulation device as well as the thermal conditioning device or devices;
   when the difference $\Delta T_1$ is greater than the setpoint $C_1$, for activating the circulation device of the fluid by keeping the thermal conditioning device or devices deactivated if the difference $\Delta T2$ is less than the setpoint C2.

9. The method of thermal management according to claim 8, wherein the setpoint $C_1$ is set between 2 and 5° C.

10. The method of thermal management according to claim 1, further comprising determining the absolute value $\Delta T_1$ of the difference between the temperature of the hottest element of said battery and the temperature of the coldest element of said battery.

11. The method of thermal management according to claim 10, further comprising activating a thermal conditioning system when the difference $\Delta T_1$ is greater than a setpoint $C_1$.

12. The method of thermal management according to claim 11, further comprising keeping the thermal conditioning device or devices deactivated if the difference $\Delta T_2$ is less than the setpoint $C_2$.

13. The method of thermal management according to claim 11, wherein activating said thermal conditioning system includes activating a circulation device of said thermal conditioning system.

* * * * *